O. J. LASHER.
MEAT DISPLAY CASE.
APPLICATION FILED OCT. 29, 1921.

1,426,747.

Patented Aug. 22, 1922.
3 SHEETS—SHEET 1.

INVENTOR.
Osmer J. Lasher
BY Harold G. Manning
ATTORNEY

O. J. LASHER.
MEAT DISPLAY CASE.
APPLICATION FILED OCT. 29, 1921.

1,426,747.

Patented Aug. 22 1922.
3 SHEETS—SHEET 2.

INVENTOR.
Osmer J. Lasher
BY Harold G. Manning
ATTORNEY

O. J. LASHER.
MEAT DISPLAY CASE.
APPLICATION FILED OCT. 29, 1921.

1,426,747.

Patented Aug. 22, 1922.
3 SHEETS—SHEET 3.

INVENTOR.
Osmer J. Lasher
BY Harold G. Manning
ATTORNEY

UNITED STATES PATENT OFFICE.

OSMER J. LASHER, OF WATERBURY, CONNECTICUT.

MEAT-DISPLAY CASE.

1,426,747.	Specification of Letters Patent.	Patented Aug. 22, 1922.

Application filed October 29, 1921. Serial No. 511,402.

*To all whom it may concern:*

Be it known that I, OSMER J. LASHER, a citizen of the United States, and a resident of Waterbury, county of New Haven, and State of Connecticut, have invented certain new and useful Improvements in a Meat-Display Case, of which the following is a specification.

This invention relates to refrigerator display cases and more particularly to an iced display counter for use in meat markets and the like.

One object of the invention is to produce a display case of the above nature having a container for a freezing mixture of ice and salt, arranged at the top of the case above the articles to be displayed.

Another object is to provide a divided container for the freezing mixture of a display case, with exterior channels so arranged as to cause a natural continuous flow of dry air over the surfaces of the container.

A further object is the production of an improved type of light-weight, thin-walled, portable meat display case, having a minimum amount of insulation.

A further object is to provide a meat display case in which the meat is cooled by an over-head mixture of ice and salt, the brine from which forms a layer upon the bottom of the case.

A further object is to produce a meat display case having a row of compartments separated by partitions, the partitions having adjustable means for controlling the circulation of air through said compartments.

A further object is the production of a meat display case having a row of compartments, all of which are available for display purposes.

A still further object is to provide a meat display case of simple and practical construction which will be cheap to manufacture, as well as efficient and economical in use.

With these and other objects in view, there has been illustrated in the accompanying drawing, one form in which the invention may be conveniently embodied in practice.

Figure 1:
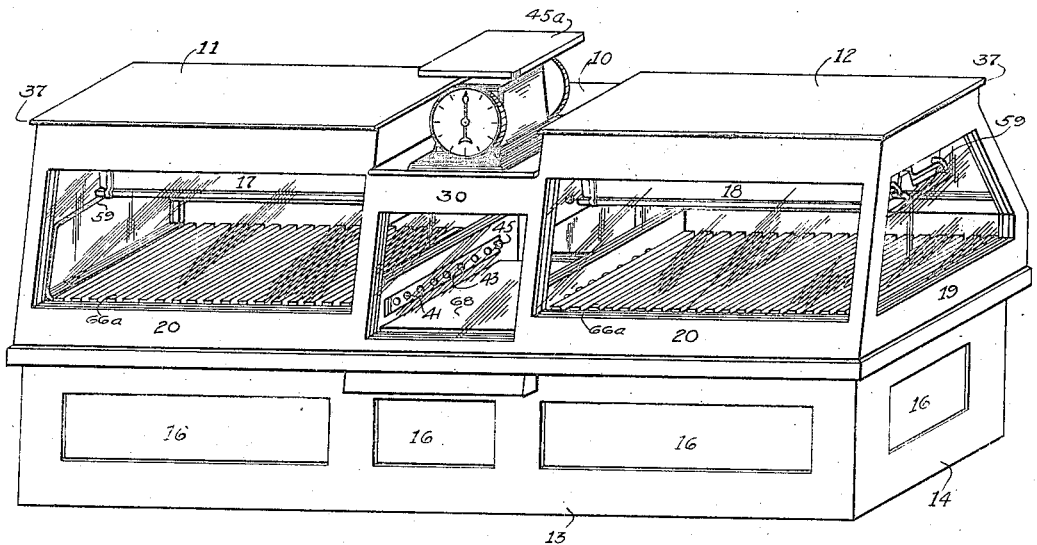
Fig. 1 represents a front perspective view of the meat display case.
Figure 2:
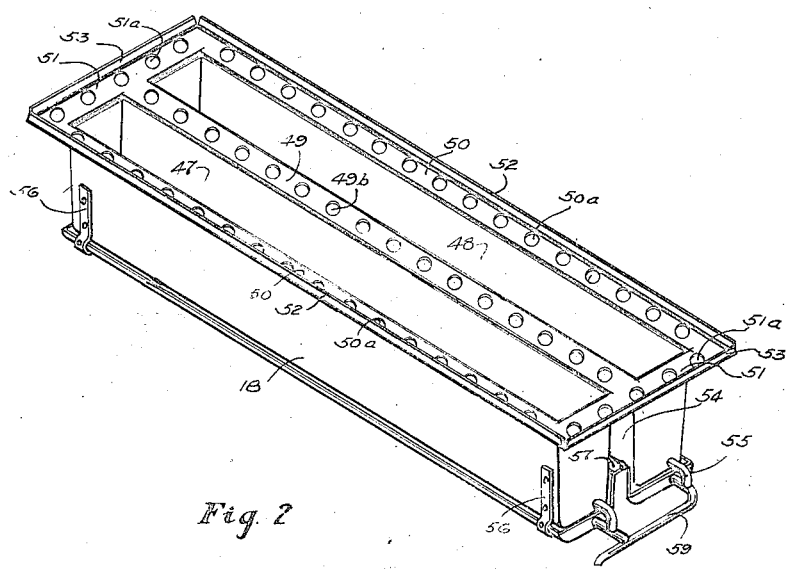
Fig. 2 is a perspective view of the freezing mixture container, shown detached from the remainder of the display case.

Referring now to the drawings in which like numerals denote corresponding parts throughout the several views, 10 represents the middle compartment of the meat display case, the end compartments arranged on a slightly higher level being shown at 11 and 12 respectively. All three compartments 10, 11 and 12, rest upon a base open at the rear, said base consisting of the front section 13 and the end sections 14 and 15.

Figure 3:
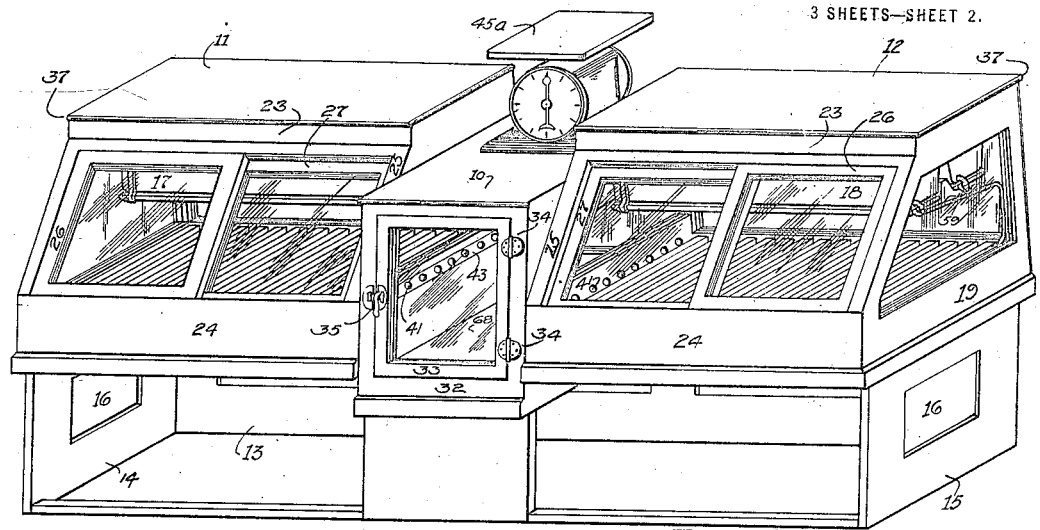
Fig. 3 is a rear perspective view of the meat display case.

Each of the base sections 13, 14, and 15, are provided with panels 16, of ornamental translucent colored glass, as clearly shown in the Figs. 1 and 3. These base sections are not flush with the walls of the display case, but are set back a short distance therefrom.

For cooling the display case, a freezing mixture is carried in bunkers 17 and 18, one of which is located in each end compartment 11 and 12. This freezing mixture, which is preferably composed of cracked ice and salt, not only cools the end compartments, but by means of a ventilation system, indirectly cools the middle compartment, as will be hereinafter described.

Each of the end cooling compartments is provided with a vertical end wall 19, and a slightly inclined side wall 20, having spaced glass panes 21, 21 and 22, 22 respectively, enclosing dead air spaces. The rear wall of each end compartment consists of two vertical top and bottom portions 23 and 24 joined by a portion inclined at an angle of 45 degrees, said portions 23, 24, and 25 forming frames in which the sashes 26 and 27 are adapted to slide. These sashes are also provided with spaced glass panes 27ª, 27ª, similar to those on the walls of the display case, and preferably have air-tight, padded, grooved portions 28 embracing the metal ribs 29, secured to the sections 25 and 24 respectively.

Figure 6:
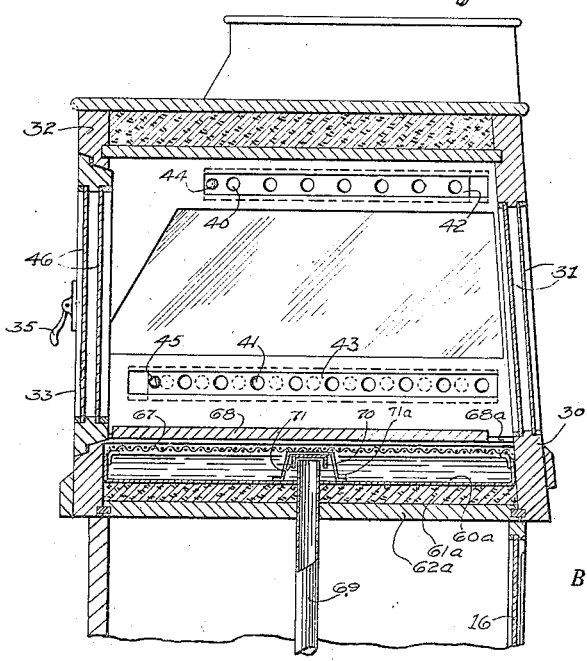
Fig. 6 is a section of the middle compartment of the meat display case, taken along the line 6—6 of Fig. 5 looking in the direction of the arrows.

As clearly shown in Fig. 6, the middle compartment 10 is provided with a slightly inclined front wall 30, having transparent glass panes 31, 31. The rear wall of the middle compartment comprises a frame 32 closed by a door 33, which is hinged at 34, 34 and is locked to the frame 32 by a latch 35. The door 33 of the middle compartment is provided with a pair of spaced glass panes 46, 46, enclosing a dead air space. The partitions 36, 36 form the sides of the middle compartment and separate it from the end compartments 11 and 12. Upon the top inner edges of the end, front, and rear walls 19, 20, and 23 of the end compartments, recesses 36$^a$ are provided, which together with the similar recesses 36$^b$ on the top edges of the partitions 36 form a seat for the metal bottoms of covers 37. A layer of mineral wool or other suitable insulation 37$^a$ is located between the top and the metal bottom in each cover. Arranged upon the outer top edge of said walls and partitions 19, 20, 23, and 36 is a layer of insulation 38 upon which the rims of the covers 37 rest.

Each of the partitions 36 is provided with a pair of spaced glass panes 39, 39, enclosing a dead-air space, immediately above and below which are two rows of horizontal ventilating holes, 40 and 41. To control the ventilation between the compartments, four slides 42, 42 and 43, 43 are provided. These slides are adjusted by the handles 44 and 45, and are mounted in dove-tailed recesses upon the inner edges of the partitions 36 adjacent to the rows of ventilating holes 40 and 41. These partitions are provided with a set of ventilation holes corresponding to those on the slides, as clearly shown in Fig. 6, in which figure the lower slide 43 is in closed position, while the upper slide 42 is in open position with its holes registering with the holes in the partition 36.

As will be evident, there are three possible arrangements of the ventilation system: (1) both slides closed; (2) one slide open; (3) both slides open. With the first arrangement, the end compartments will be maintained in their coldest condition, while the middle compartment will be at its warmest. The maximum range of temperature will then be obtained. When, however, one slide is open, the three compartments will be at three distinct temperatures: the closed compartment, being coldest, as for example, below freezing; the other end compartment being warmer, as, for example between thirty and forty degrees Fahrenheit; while the middle compartment is the warmest, as for example, between forty-five and fifty degrees Fahrenheit. In the third arrangement, when both slides are open, the temperature of the middle compartment will be at its coldest, although of course, considerably warmer than either of the end compartments.

As the middle compartment will be always warmer than the ends, this compartment is well adapted for displaying a tub of butter or other articles requiring less refrigeration than the meat in the end sections.

By having the middle compartment arranged on a somewhat lower level than the end compartments, its top may be used as a wrapping board, and as a support for weighing scales, 45$^a$. This feature constitutes a considerable advantage over the usual display cases, the tops of which are so high that an additional table has to be employed for weighing and wrapping the mechandise.

Each of the cooling bunkers 17 and 18, comprises a pair of trough-like portions 47 and 48, connected at the top by a horizontal member 49, which is provided with a series of perforations 49$^b$. The troughs 47 and 48 are separated by a central ventilation space 54. The upper edges of the bunker have horizontal side flanges 50 and horizontal end flanges 51, terminating in up-standing rims 52 and 53, the rims 52 and 53 being secured as by screws or nails, to the walls 19, 20, 23, and 36 of the display case. The horizontal flanges 50 and 51 are also perforated, as at 50$^a$ and 51$^a$.

In order to catch the condensed moisture from the exterior of the bunkers, drip-pans 55 are provided, which are preferably secured to the troughs 47 and 48, as by the straps 56, soldered to the four corners of the bunker. Each drip-pan 55 is provided at its center with an inverted U-shaped tube 57, extending up into the central space 54 between the troughs. The top of the tube 57 has a series of ventilation openings 58 similar to the perforations 49$^b$, 50$^a$, and 51$^a$ previously described. By means of this construction, a natural circulation of air in the case is permitted to take place.

Figure 4:
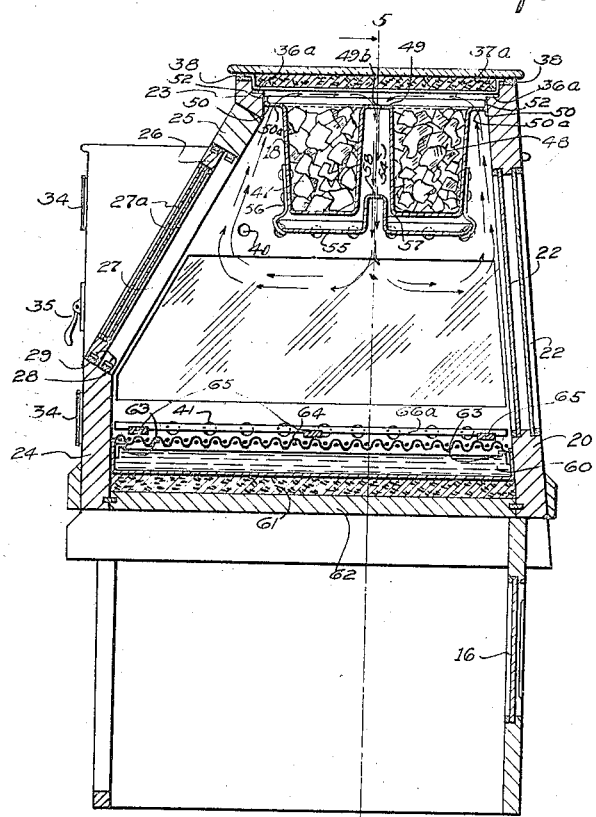
Fig. 4 is a section of one of the end compartments of the meat display case taken along the line 4—4 of Fig. 5 looking in the direction of the arrows.
Figure 5:
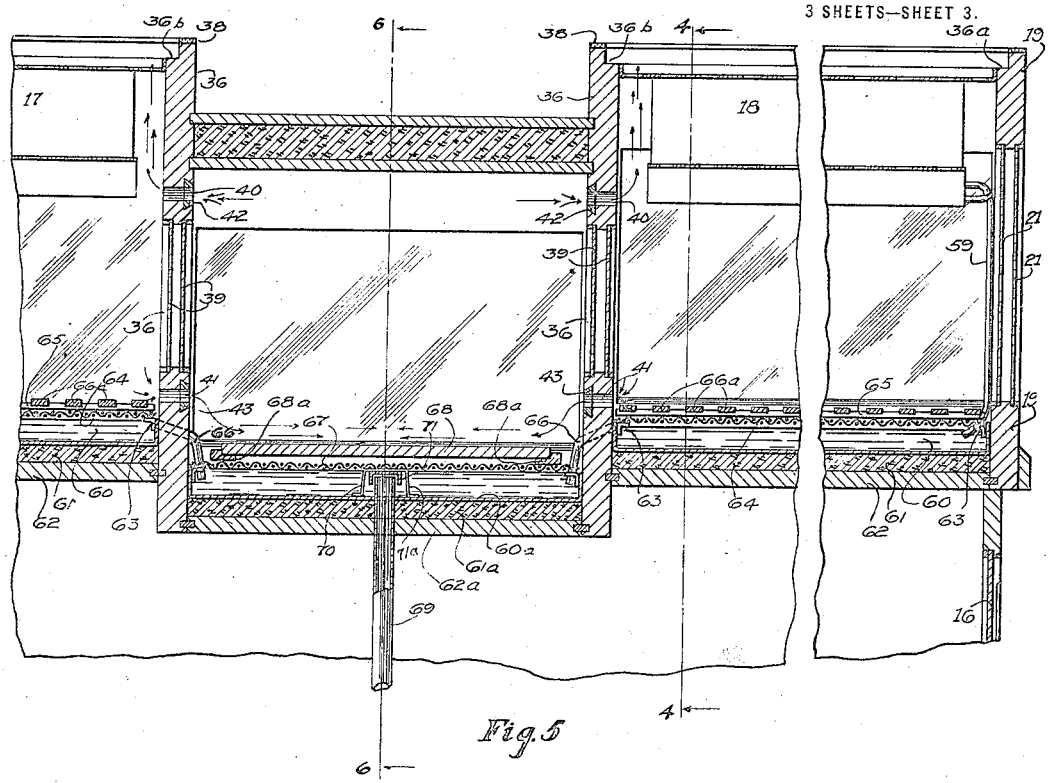
Fig. 5 is a rear longitudinal section taken along the line 5—5 of Fig. 4 looking in the direction of the arrows.

In operation, the air cooled by the freezing mixture in the bunkers flows downward through the space 54 between the troughs, through the tube 57, and strikes the meat or other articles below, cooling them. A portion of the cold air is drawn into the lower ventilation openings of the middle compartment and returns through the upper ventilation openings. The stream of air after being warmed by contact with the meat, butter or other articles, as well as the walls of the display case, then rises through the spaces surrounding the bunkers to the top of the troughs, and again descends through the central space 54, this cycle being indefinitely repeated until all the ice has melted. The direction of the natural air circulation through the case is clearly indicated by arrows in Figs. 4 and 5. The brine from the melting ice and the salt of the freezing mixture collects in the bottom of the troughs 47 and 48, and together with the "drip" or condensation water from the drip-pan, flows through the pipes 59, located adjacent the end walls 19, into the brine-pans 60 of the end compartments. The location of the brine-pipes 59, at the extreme ends of the display case, is desirable as this arrangement causes the liquid to flow along the brine-pans toward the middle compartment, thus keeping the brine at a practically uniform temperature throughout the brine-pans 60.

Each of the brine-pans 60 is supported upon an insulation layer 61, of mineral wool or the like, resting upon the bottoms 62 of the end compartments. A plurality of lugs 63 are soldered to the top of each brine-pan and serve to support a wire screen 64 which prevents small scraps of meat or other refuse from falling into the brine below.

The meat display shelves are preferably supported upon the screens 64, each shelf being preferably composed of three sections, to permit easy removal for cleaning purposes. Each section of these shelves consists of a pair of cross members 65 to which are secured a plurality of long slats 66ª, as by screws or nails.

After flowing through the end brine-pans, the brine descends by gravity through outlet pipes 66 in the partitions 36. The pipes 66 empty below the surface of the brine layer in the brine-pan 60ª of the middle compartment. The brine-pan 60ª is supported upon an insulation layer 61ª, resting upon the bottom 62ª. A screen 67, similar to the screen 64, is arranged above the brine-pan 60ª. A board 68 is slidably mounted upon the cross rails 68ª and is adapted to receive a tub of butter or other articles to be displayed in the middle compartment.

For removing the brine from the display case, a drain-pipe 69 is arranged in the middle compartment, and passes down through the center of the brine-pan 60ª, the insulation layer 61ª, and the bottom 62ª of said compartment. The drain-pipe 69, which preferably is soldered or otherwise secured to the brine-pan 60ª to form a water-tight joint, projects above the bottom of said brine-pan a sufficient distance to maintain a layer of brine of appreciable depth. The height of the inlets to the pipes 66 in the partitions 36 determines the level of the brine layers in the end compartments.

The most efficient depth for the brine layers depends greatly upon operating conditions, such as the size of the display case, the thickness and character of the wall insulation, and the rapidity with which the ice is melted. Generally in a 10 foot case, a depth of 3 inches will be found suitable.

In order to prevent air or sewer gas from entering the display case, a trap 70 is provided. This trap consists of a short inverted cup 71, of larger diameter than the drain pipe 69, having its open end extending downwardly around the top of the drain-pipe. This cup has secured to its base, by soldering or in any other suitable manner, a U-shaped frame formed by bending from a flat rectangular piece of sheet metal, as shown in Fig. 6. The legs 71ª of this frame rest upon the bottom of the brine-pan 60ª and are of such length that the base of the cup is spaced slightly above the top of the pipe 69. This construction permits the brine to flow freely into the drain-pipe, and at the same time effectively keeps out air and sewer gases.

In operation, when it is desired to use the display case, the ice bunkers are filled with the freezing mixture of ice and salt, and the covers 37 are then placed in position. After the slides in the partitions 36 have been then adjusted, the meat, butter or other articles are placed upon the shelves in the three compartments of the case, and refrigeration then takes place. When the freezing mixture has become exhausted, the covers should be removed from the top of the end compartments so that a new supply may be placed in the bunkers.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit; in short, the invention includes all the modifications and embodiments coming within the scope of the following claims.

Having thus fully described the invention, what is claimed as new, and for which it is desired to secure Letters Patent, is:

1. In a refrigerator display case, a pair of spaced twin troughs providing a central ventilating and circulating space therebetween, said troughs having perforated horizontal flanges around their top edges, and having vertical rims surrounding said flanges, and a divided drip pan below said troughs, said dip-pan having a central tube extending upwardly into said ventilating and circulating space.

2. In a refrigerator display case, a middle display compartment, side display compartments at opposite ends of and insulated from said middle compartment, cooling means in said side compartments, and means located between said middle and side compartments for controlling the flow of cooled air to said middle compartment from said side compartments whereby the temperature of said middle compartment may be adjusted relatively to the temperature of said side compartments.

3. In a refrigerator display case, a central display compartment, side display compartments arranged at opposite ends of said central compartment, means for supporting a layer of brine in the bottom of each compartment, the brine supporting means in said end compartments being arranged above the plane of the brine supporting means in said central compartment, and means for permitting the overflow of brine from the brine supporting means in the end compartments to drain into the brine supporting means in said central compartment.

4. In a meat display case, a chamber for containing a freezing mixture of ice and salt, said chamber comprising a pair of twin parallel troughs connected by horizontal perforated flanges to the walls of the case and to each other, a divided drip-pan located below said troughs and connected thereto, said drip-pan having a central tube open at the top, whereby a natural circulation of air will take place up around the sides of said troughs and down through the central tube of said drip-pan.

5. In a meat display case, a container for a freezing mixture of ice and salt comprising a pair of connected spaced parallel troughs separated by a central ventilation space, said troughs having closed bottoms, a drip-pan connected to said troughs and having a central upwardly projecting tube extending into said ventilation space between said troughs.

6. In a refrigerating meat display counter, a casing, two vertical partitions dividing said casing into three meat display compartments, each of said compartments having a brine-pan at the bottom thereof, each of said end compartments having a bunker containing a cooling mixture of ice and salt, means for circulating the brine formed from said cooling mixture through said brine-pans, and means for draining the brine from said casing.

7. In a refrigerating meat display counter, a casing, two vertical partitions dividing said casing into three compartments in each of which meat or other articles may be displayed, each of said compartments having a brine-pan at the bottom thereof, each end compartment having a bunker for containing a cooling mixture of ice and salt, means for permitting the circulation of the brine formed from said cooling mixture from the end compartments to the center compartment, and means for draining the brine from the center compartment.

8. In a refrigerating meat display counter, a case having a plurality of compartments, one of said compartments having a cooling chamber for containing a mixture of ice and salt, adjustable means for controlling the circulation of air between said compartments, a brine-pan in the bottom of the cooling compartment, a second brine-pan in the bottom of an adjacent compartment, said second brine-pan being lower than the first brine-pan, means for delivering the brine formed in said cooling chamber to said first brine-pan, a pipe connecting said brine-pans, to permit the brine to flow from the higher to the lower, and means for draining the brine from said lower brine-pan.

In testimony whereof, I have affixed my signature to this specification.

OSMER J. LASHER.